US012703642B2

(12) United States Patent
Nakaya et al.

(10) Patent No.: US 12,703,642 B2
(45) Date of Patent: Aug. 11, 2026

(54) CUBIC CRYSTAL ALKALI METAL MANGANATE NANOPARTICLE PRODUCTION METHOD AND CUBIC CRYSTAL LiMnO2 NANOPARTICLES PRODUCED USING SAME

(71) Applicants: STANLEY ELECTRIC CO., LTD., Tokyo (JP); TOHOKU UNIVERSITY, Sendai (JP)

(72) Inventors: Masafumi Nakaya, Tokyo (JP); Takuya Kazama, Tokyo (JP); Wataru Tamura, Tokyo (JP); Yasuyuki Miyake, Tokyo (JP); Atsushi Muramatsu, Miyagi (JP); Kiyoshi Kanie, Miyagi (JP)

(73) Assignees: STANLEY ELECTRIC CO., LTD., Tokyo (JP); TOHOKU UNIVERSITY, Miyagi (JP)

( * ) Notice: Subject to any disclaimer, the term of this patent is extended or adjusted under 35 U.S.C. 154(b) by 746 days.

(21) Appl. No.: 18/020,541

(22) PCT Filed: Aug. 3, 2021

(86) PCT No.: PCT/JP2021/028816
§ 371 (c)(1),
(2) Date: Feb. 9, 2023

(87) PCT Pub. No.: WO2022/044726
PCT Pub. Date: Mar. 3, 2022

(65) Prior Publication Data

US 2023/0257281 A1 Aug. 17, 2023

(30) Foreign Application Priority Data

Aug. 25, 2020 (JP) ................................ 2020-141544

(51) Int. Cl.
*C01G 45/1228* (2025.01)
*B82Y 30/00* (2011.01)
(Continued)

(52) U.S. Cl.
CPC ........ *C01G 45/1228* (2013.01); *H01M 4/505* (2013.01); *B82Y 30/00* (2013.01);
(Continued)

(58) Field of Classification Search
CPC ... C01G 45/1228; H01M 4/505; B82Y 30/00; C01P 2002/72; C01P 2004/04; C01P 2004/30; C01P 2004/64
(Continued)

(56) References Cited

U.S. PATENT DOCUMENTS 6,190,800 B1 * 2/2001 Iltchev .................. C01G 45/02 429/231.95
10,056,604 B2 8/2018 Park et al.
(Continued)

FOREIGN PATENT DOCUMENTS

CN 104600286 A * 5/2015
CN 107658460 A * 2/2018 ............ H01M 4/366
(Continued)

OTHER PUBLICATIONS

"Development of high performance power storage system technology for next-generation automobiles / Next-generation technology development / Material design of next-generation high capacity cathode material oxide by high pressure synthesis method", in NEDO Report, Apr. 2012 p. 26 (With partial translation).
(Continued)

*Primary Examiner* — Anthony J Zimmer
*Assistant Examiner* — Annette Phan
(74) *Attorney, Agent, or Firm* — Holtz, Holtz & Volek PC

(57) ABSTRACT

A $LiMnO_2$ production method includes generating cubic crystal $LiMnO_2$ nanoparticles by adding an organic solvent,
(Continued)

manganese oxide nanoparticles, and lithium amide in a reaction vessel and heating in an inert atmosphere. and a washing and recovering the generated particles. Wurtzite type MnO nanoparticles are preferably used as the manganese oxide. As a result, $LiMnO_2$ nanoparticles that have a substantially similar particle size to wurtzite type MnO nanoparticles can be obtained from an Mn raw material. Nanoparticles having a hollow structure can be obtained by controlling the reaction temperature.

5 Claims, 3 Drawing Sheets

(51) Int. Cl.
*B82Y 40/00* (2011.01)
*H01M 4/505* (2010.01)

(52) U.S. Cl.
CPC ........... *B82Y 40/00* (2013.01); *C01P 2002/72* (2013.01); *C01P 2002/76* (2013.01); *C01P 2004/04* (2013.01); *C01P 2004/30* (2013.01); *C01P 2004/64* (2013.01); *C01P 2006/40* (2013.01)

(58) Field of Classification Search
USPC .......................................................... 423/599
See application file for complete search history.

(56) References Cited

U.S. PATENT DOCUMENTS

2003/0044346 A1* 3/2003 Kumar ............... C01G 45/1228 423/599
2015/0104707 A1 4/2015 Park et al.

FOREIGN PATENT DOCUMENTS

ES 2718917 T3 * 7/2019 ........ H01M 10/0525
JP 2016524275 A 8/2016
JP 2020059622 A 4/2020

OTHER PUBLICATIONS

International Search Report (ISR) (and English language translation thereof) dated Oct. 19, 2021, issued in International Application No. PCT/JP2021/028816.
Written Opinion dated Oct. 19, 2021, issued in International Application No. PCT/JP2021/028816.
Sato, et al., "Metastable and nanosize cation-disordered rocksalt-type oxides: revisit of stoichiometric LiMnO2 and NaMnO2", Journal of Materials Chemistry A, 2018, pp. 13943-13951.
Sugiyama, et al., "A new variety of LiMnO2: high-pressure synthesis and magnetic properties of tetragonal and cubic phases of LixMn1—xO (x~0.5)", Materials Science & Engineering B, 2001, vol. B84. pp. 224-232.
Tabuchi, et al., "Electrochemical and magnetic properties of lithium manganese oxide spinels prepared by oxidation at low temperature of hydrothermally obtained LiMnO2", Solid State Ionics, vol. 89, pp. 53-63, 1996.
International Preliminary Report on Patentability (IPRP) (and English language translation thereof) dated Mar. 9, 2023, issued in counterpart International Application No. PCT/JP2021/028816.
Chinese Office Action (and an English translation thereof) dated Feb. 22, 2025, issued in counterpart Chinese Application No. 202180060613.2.

* cited by examiner

CUBIC CRYSTAL ALKALI METAL MANGANATE NANOPARTICLE PRODUCTION METHOD AND CUBIC CRYSTAL LiMnO2 NANOPARTICLES PRODUCED USING SAME

TECHNICAL FIELD

The present invention relates to alkali metal manganate nanoparticles such as lithium manganate as a representative example, and more particularly, to cubic crystal $LiMnO_2$ nanoparticles.

BACKGROUND ART

Lithium manganate is a material that is attracting attention as a positive electrode material for lithium ion batteries, and a plurality of materials having different proportions of Li, Mn, and O, such as $LiMn_2O_4$, $LiMnO_3$, and $LiMnO_2$ have been developed. Further, since the characteristics of the positive electrode material such as initial discharge capacity, and charge and discharge characteristics depend on the crystal structure of the positive electrode material, various production methods and treatments for obtaining the desired crystal structure have also been proposed.

For $LiMnO_2$, for example, NPL 1 discloses a method for obtaining cubic crystal $LiMnO_2$ nanoparticles by mechanically milling orthorhombic $LiMnO_2$. In this method, a mixture of $Li_2CO_3$ and $Mn_2O_3$ is first heated and synthesized at 900° C. in an inert atmosphere to obtain bulk orthorhombic $LiMnO_2$ as a precursor. Then, the resultant precursor is pulverized by mechanical milling to obtain the desired cubic crystal nanoparticles. It is considered that the resultant particles are a mixture of particles with a wide range of sizes from several micron order to several tens of nanometers.

Further, NPL 2 reports an example in which cubic crystal $LiMnO_2$ is synthesized by a high pressure synthesis method. In this method, $Li_2O$ and $Mn_2O_3$ are mixed and synthesized in a gold capsule under ultra high pressure and high temperature conditions of 4.5 GPa and 1000° C., and the powder obtained as a mixture of $Li_2O$ and $LiMnO_2$ is treated with water, and single-phase cubic crystal $LiMnO_2$ is finally recovered.

CITATION LIST

Non Patent Literature

NPL 1: Journal of Materials Chemistry A 2018, 6, 13943, Takahiko Sato, et. al.

NPL 2: "Development of high performance power storage system technology for next-generation automobiles/Next-generation technology development/Material design of next-generation high capacity cathode material oxide by high pressure synthesis method" in NEDO Report, April 2012 p. 26

SUMMARY OF INVENTION

Technical Problem

The method described in NPL 1 requires high temperature treatment for a long period of time to obtain bulk $LiMnO_2$ as a starting material for obtaining cubic crystal nanoparticles, and further requires a high temperature reaction for a long period of time to allow the precursors to react with each other. Further, it is necessary to perform mechanical milling for a long period of time to obtain nanosize, but it is difficult to control the particle size with mechanical milling, and since the resultant particles are mixed with particles with sizes in the micro order, it is difficult to obtain particles with an average particle size of 100 nm or less.

The method described in NPL 2 involves a smaller number of treatments than the technique in NPL 1, but since it involves synthesis under extremely high pressure of 4.5 GPa at a high temperature, equipment that can handle high pressure and high temperature conditions is required.

An object of the present invention is to provide a method for producing cubic crystal alkali metal manganate nanoparticles, and particularly, cubic crystal $LiMnO_2$ nanoparticles, without requiring special synthesis conditions or treatments and without having coarse particles mixed therein.

Solution to Problem

In order to achieve the object described above, a method for producing alkali metal manganate nanoparticles of the present invention includes a process of generating cubic crystal alkali metal manganate nanoparticles by adding an organic solvent, manganese oxide nanoparticles, and lithium amide in a reaction vessel and heating in an inert atmosphere, and a process of washing and recovering the generated particles. In the method for producing $LiMnO_2$ of the present invention, wurtzite type MnO nanoparticles are preferably used as a raw material.

Further, the cubic crystal $LiMnO_2$ of the present invention is $LiMnO_2$ that is produced by thermal synthesis and has an average particle size of 100 nm or less. In addition, the cubic crystal $LiMnO_2$ has a hollow structure.

Advantageous Effects of Invention

According to the present invention, it is possible to provide alkali metal manganate nanoparticles such as cubic crystal $LiMnO_2$ as a representative example, without requiring special reaction equipment or an additional treatment such as mechanical milling. The cubic crystal $LiMnO_2$ of the present invention has a hollow structure such that when the cubic crystal $LiMnO_2$ is used as a lithium battery material, by adding inclusions in the hollow portion, the charge and discharge characteristics can be improved and the life of the positive electrode material and eventually the life of the lithium battery can be extended.

Figure 3:
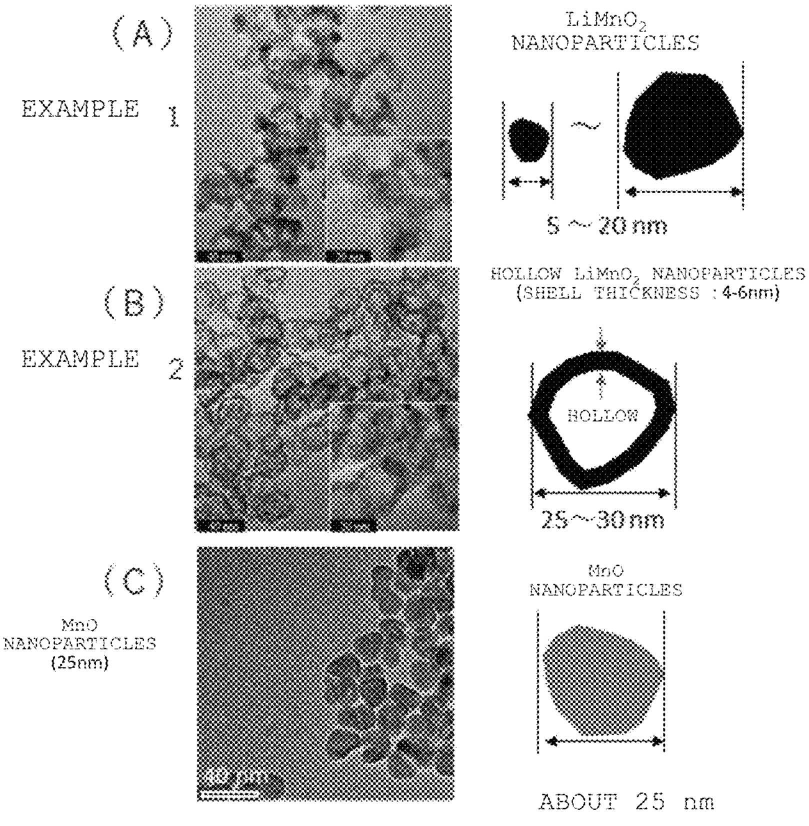

(A) to (C) of FIG. 3 are diagrams illustrating transmission electron microscope images of particles obtained in Examples 1 and 2 and the MnO particles used as a raw material.

DESCRIPTION OF EMBODIMENTS

Embodiments of a method for producing cubic crystal alkali metal manganate of the present invention will be described below. Here, a method for producing nanoparticles of $LiMnO_2$, which is a typical alkali metal manganate, will be described.

The production method of the present invention is based on synthesis by a pyrolysis method, and as illustrated in FIG.

1, includes a process of preparing a Mn raw material, a process of charging the Mn raw material, Li raw material, and a solvent into a reaction vessel, a process of raising the temperature to a predetermined temperature of 350° C. or less and allowing to react for a predetermined time (about 60 minutes), and a process of recovering particles from the reaction solution. Each process will be described in detail below.

Process 1

In the production method of the present invention, manganese oxide (MnO) nanoparticles and Li complexes such as lithium amide ($LiNH_2$) are used as raw materials. By a new combination of manganese oxide and lithium amide, the need for high pressure, high temperature of 1000° C., and long-time reaction is eliminated, and it is possible to generate cubic crystal $LiMnO_2$ in a reaction by the general pyrolysis method. In particular, wurtzite type nanoparticles are used as manganese oxide to easily obtain cubic crystals and further facilitate the control of particle size.

The stable crystal structure of MnO is generally a rock salt type, but MnO is theoretically known to have a wurtzite type crystal structure, and while there are several examples of producing them, there has been no known method for stably obtaining only the wurtzite type MnO nanoparticles by synthesis. The present applicant has developed and proposed a method for producing wurtzite type MnO nanoparticles by pyrolytic synthesis (Japanese Patent Application No. 2019-205644). According to this method, a predetermined reducing agent is added and synthesized to the reaction system to suppress the generation of rock salt type MnO and layered double hydroxide, which is a by-product, and stably obtain wurtzite type MnO having a particle size of 100 nm or less.

Specifically, when manganese oxide particles are synthesized by thermally decomposing a compound containing manganese, a reducing agent consisting of at least one of a polyol-based material and an ethylene glycol stearate-based material, and preferably, a particle size inhibitor are added to the reaction system as additives. Then, after nucleation by heating at a temperature of 200° C. or less, preferably 110 to 150° C., in a reduced pressure atmosphere (pressure of 1000 Pa or less, preferably 100 Pa or less), the temperature is raised and heating is performed at 225° C. to 275° C. in an inert gas atmosphere to grow particles. The reaction time in the particle growth process can be controlled to control the size of the manganese oxide particles to, for example, about 2 nm to 100 nm, preferably 30 nm or less. The average particle size can be, for example, 100 nm or less, or more preferably, 40 nm or less. After the particles are grown, the temperature is further raised to about 300° C. to mature the particles, whereby the size can be made uniform.

According to the production method of the present invention, the wurtzite type MnO nanoparticles (6 to 30 nm) prepared by the method described above may be used as the Mn raw material to obtain cubic crystal $LiMnO_2$ nanoparticles having a controlled particle size.

A Li complex such as $LiNH_2$ and $LiNR^1R^2$ ($R^1$ and $R^2$ are hydrogen or alkyl groups) is used as a Li raw material. Among these, $LiNH_2$ with high activity is particularly preferred. Li source ranging from equimolar to 100-fold molar ratio to MnO may be used, but the Li source is preferably used in excess of the stoichiometric ratio. $LiNH_2$ may be used in excess (for example, 50 equivalent amount or more) to stably obtain $LiMnO_2$ particles.

An oxygen-containing organic solvent as an oxygen source of $LiMnO_2$ is used as the solvent. Ether solvents such as diphenyl ether, benzyl ether, and di-n-octyl ether, for example, may be preferably used as the oxygen-containing organic solvent, and diphenyl ether is particularly preferred.

Process 2

Since the reaction is carried out in an inert gas atmosphere, after the Mn raw material and the solvent are charged into the reaction vessel, the Li source ($LiNH_2$) is charged into the reaction vessel in the inert gas atmosphere, and then the reaction vessel is placed in the pressure resistant container and the container is sealed.

Process 3

Heating is performed up to the reaction temperature (at a heater temperature of 150 to 350° C.) in an atmosphere of an inert gas such as nitrogen. The rate of temperature rise is preferably relatively slow, for example, about 5° C./min. After reaching the reaction temperature, the temperature is maintained for a predetermined time. The reaction is thought to proceed as follows. An example in which the Li source is $LiNH_2$ will be described below. In this reaction, the reaction proceeds with the wurtzite type MnO nanoparticles as the starting material (nucleus), $LiNH_2$ is coordinated to the particle surface, and the atoms in the MnO particles react with Li on the surface of the nanoparticles to form $LiMnO_2$ crystals. At that time, the wurtzite type crystal (the arrangement of atoms) in a metastable phase undergoes a crystal structure transformation into the stable $MnO_2$ phase by heating. On the other hand, $LiNH_2$ present in the system is active such that the $LiNH_2$ is easily decomposed in the presence of other materials at a high temperature and becomes a source of Li, and Li in the active state is incorporated into the MnO crystal structure to form a phase of cubic crystal $LiMnO_2$ incorporating oxygen in the solvent.

Further, when the reaction temperature is relatively high (for example, about 350° C.), the reaction rate is high so that solid particles are obtained. On the other hand, hollow particles are obtained at relatively low temperature (for example, 200° C.). It is considered that the growth rate of $LiMnO_2$ is slow under the condition of low reaction temperature such that a rapid reaction easily occurs at the contact point between active $LiNH_2$ and MnO, in which the atoms in the MnO nanoparticles move toward $LiNH_2$ coordinated on the surface of the MnO nanoparticles for reaction so that the inside becomes hollow, resulting in a hollow structure. In this way, it is possible to control the form of the particles to be generated by controlling the reaction temperature.

The reaction time is about 30 minutes to 2 hours. In the production method of the present invention, the synthesis is completed in a short time as a result of the reaction described above. After the reaction, the reaction vessel is rapidly cooled, and then the reaction vessel is removed from the pressure resistant container.

Process 4

The recovery of the particles from the reaction system is the same as the general method for recovering metal oxides after synthesis, in which, after repeated centrifugation using a solvent, the particles are washed and recovered.

The obtained particles are cubic crystal $LiMnO_2$ having an average particle size of 100 nm or less. The particle size of the MnO nanoparticles may be appropriately selected to set the average particle size to 40 nm or less. A solid or hollow shape may be obtained.

The average particle size referred to herein is the average value calculated by measuring the particle sizes of 200 to 2000 particles with a transmission electron microscope.

According to the production method of the present invention, cubic crystal $LiMnO_2$, which could only be obtained with the generation method involving extremely high temperature, high pressure, and long period of time, can be obtained under mild conditions of 350° C. or less in a short time, and nanoparticles can be prepared without additional treatment. In addition, the particle size of the cubic crystal $LiMnO_2$ nanoparticles depends on the size of the starting material MnO nanoparticles so that the particle size of the $LiMnO_2$ nanoparticles may be controlled, and the average particle size of the obtained particles is less than 100 nm.

Further, hollow-structured $LiMnO_2$ nanoparticles can be formed according to the reaction conditions. Further improvement in charge and discharge characteristics and weight reduction can be expected from the lowered density due to the hollow structure and the controlled particle size and thickness.

The method for producing cubic crystal $LiMnO_2$ of the present invention is described above, but the production method is also applicable to the synthesis of other alkali metal manganates such as $NaMnO_2$. It is considered that the Li source complex may be replaced with, for example, a Na source to prepare $NaMnO_2$ nanoparticles and hollow-structured nanoparticles thereof, which are expected to be candidates for other electrode materials.

EXAMPLES

Examples of the production method of the present invention are described below.

Example 1

Preparation of MnO Nanoparticles 10 mL of oleylamine was used as solvent, 1.5 mmol of manganese stearate (st-Mn) was used as a manganese material, 3.0 mmol of ethylene glycol (EG) was used as a reducing agent, 3.6 mmol of trioctylphosphine (TOP) and 1.8 mmol of sulfur were used as a coordinating agent.

After filling the material in a vessel (100 mL), the material was held at 70° C. in a nitrogen atmosphere for 30 minutes, then heated and held at 140° C. under a reduced pressure atmosphere for 2 hours. The pressure at this time was about 100 Pa. Then, it was heated to 250° C. at a heating rate of 50° C./5 minutes and held at 250° C. for 2 hours under $N_2$ atmosphere for crystal growth. Then, it was further heated and held at 300° C. for 15 minutes under $N_2$ atmosphere for crystal ripening.

After cooling, 5 mL of hexane was added to the reaction solution and stirred, and recovered in a centrifuge tube. The particles were aggregated by adding ethanol, which is a poor solvent, and sedimented using a centrifuge. After discarding the supernatant liquid, 5 mL of hexane was added and stirred for 30 minutes with a shaker to disperse the particles. Ethanol was added again, and the same process was repeated once more to wash the particles to obtain MnO particles (red) with a particle size of 25 nm (the particle size was confirmed by TEM).

Synthesis of Cubic Crystal $LiMnO_2$

After adding 0.14 mmol of 25 nm MnO nanoparticles prepared as described above and 6 mL of diphenyl ether (liquid) as a solvent to a reaction vessel (100 mL), 10.8 mmol of $LiNH_2$ (powder) was added to the reaction vessel under $N_2$ atmosphere, and the reaction vessel was placed in a pressure resistant container and sealed.

In an $N_2$ atmosphere, heating was performed at a heating rate of 5° C./min until the heater temperature reached 350° C., and after reaching 350° C., it was held for 60 minutes to complete the reaction. After quenching, the reaction vessel was removed from the pressure resistant container.

The operation of adding 40 mL of ethanol to the reaction solution and centrifuging was repeated five times. After that, the separated particles were washed with ethanol and recovered.

Example 2

0.14 mmol of 25 nm MnO nanoparticles prepared in the same manner as in Example 1, 10.8 mmol of $LiNH_2$ (powder), and 6 mL of solvent (diphenyl ether) were added to the reaction vessel in the same order as in Example 1, and the reaction was carried out under $N_2$ atmosphere. In this example, heating was performed at a heating rate of 5° C./min to 200° C. (heater temperature) and it was held at that temperature for 60 minutes. After the reaction, as in Example 1, quenching, centrifugation using ethanol (5 times) and washing were carried out and the particles were recovered.

Evaluation of Recovered Particles

Figure 1:
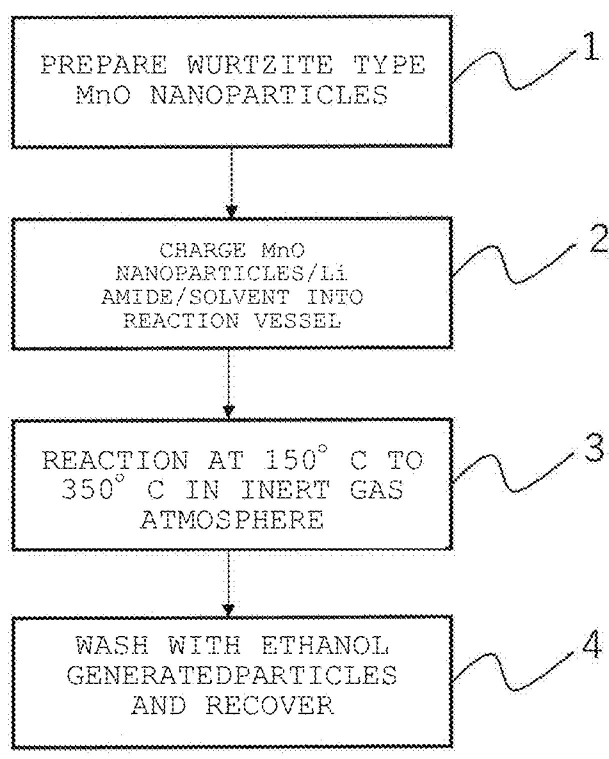
FIG. 1 is a diagram illustrating an outline of a method for producing $LiMnO_2$ according to the present invention.
Figure 2:
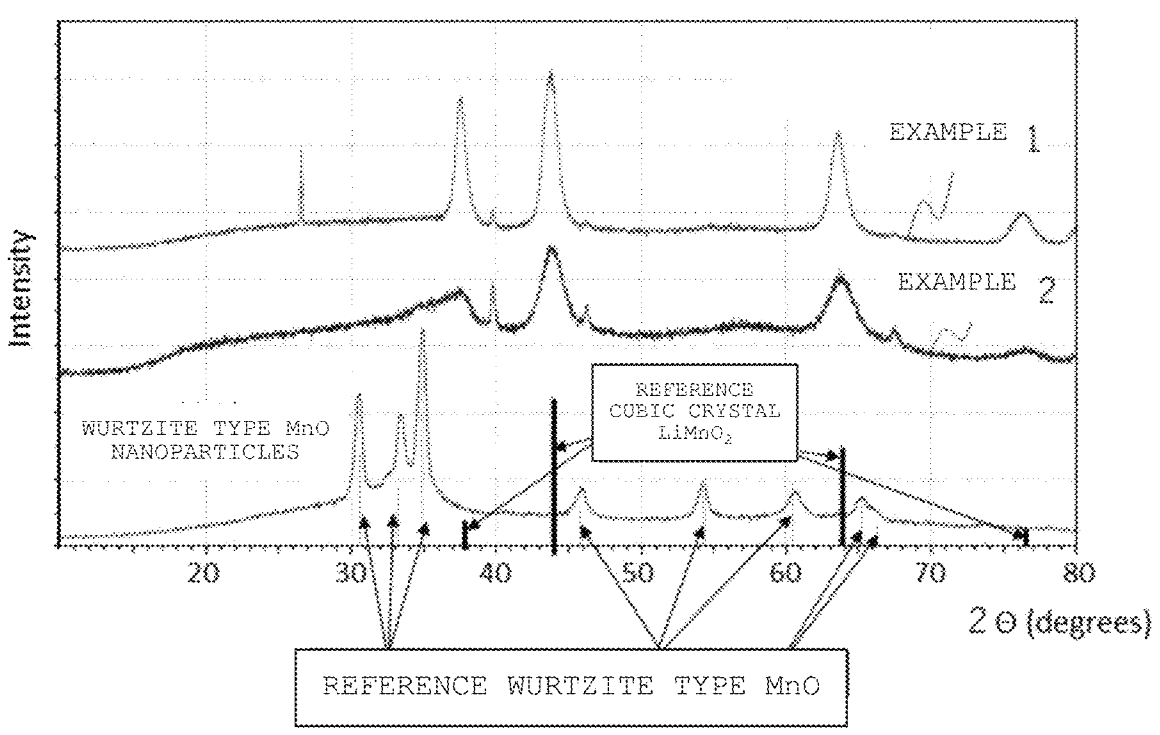
FIG. 2 is a diagram illustrating X-ray diffraction (XRD) patterns of particles obtained in Examples 1 and 2.

The particles recovered respectively in Examples 1 and 2 and the MnO used as a raw material were analyzed by X-ray diffraction (XRD) and transmission electron microscope (TEM). The X-ray diffraction pattern is shown in FIG. 2, and the TEM images are shown in (A) to (C) of FIG. 3. In FIG. 2, the bars shown below the diffraction pattern are reference diffraction peaks, in which the thick line represents cubic crystal $LiMnO_2$ (COD 1514037 $Li_{0.5}Mn_{0.5}$ O), and the thin line represents wurtzite type MnO (COD 4117966 MnO). In addition, FIG. 3 together shows a schematic diagram of the particle size and structure analyzed from the TEM image.

As shown in FIG. 2, in both the particles of Examples 1 and 2, peaks were observed at positions coinciding with the peaks of the reference (cubic crystal $LiMnO_2$), confirming the formation of the cubic crystal $LiMnO_2$ phase. It was also confirmed that the raw material MnO was of the wurtzite type.

As shown in FIG. 3, in both Examples 1 and 2, the particle diameter of the obtained particles was smaller than 100 nm and generally 30 nm or less. Moreover, it was confirmed from the TEM image that the average particle size was 19 nm in Example 1. Further, from the TEM image, it was confirmed that a hollow structure was formed in Example 2, that has an average particle size of 26 nm and a shell thickness of about 4 to 6 nm.

It is to be noted that the particle size of the MnO nanoparticles used as the raw material and the particle size of the $LiMnO_2$ produced are almost the same, and this is believed to be due to the active $LiNH_2$ dissolving the MnO particles, as treatment at a high temperature is carried out upon Li entering the MnO nanoparticles during the reaction. To confirm this, the particle size was checked after treating the MnO particles at 350° C. without the addition of $LiNH_2$, and no influence of this heat treatment on the particle size was observed.

MnO particles having a particle size different from the nanoparticles (25 nm) used in Example 1 were used as the MnO nanoparticles, and the same reaction as in Example 1 was performed, and it was confirmed that $LiMnO_2$ having the same particle size as the MnO nanoparticles used as the raw material was obtained.

The invention claimed is:

1. A method for producing alkali metal manganate nanoparticles comprising:

a process of generating cubic crystal alkali metal manganate ($MMnO_2$) nanoparticles by adding an organic solvent, manganese oxide nanoparticles, and an alkali metal (M) complex in a reaction vessel and heating in an inert atmosphere; and a process of washing and recovering the generated particles, wherein the manganese oxide nanoparticles are hexagonal manganese oxide (II) nanoparticles.

2. The method for producing alkali metal manganate nanoparticles according to claim 1, wherein the alkali metal (M) complex is lithium amide and the cubic crystal alkali metal manganate nanoparticles are cubic crystal $LiMnO_2$ nanoparticles.

3. The method for producing alkali metal manganate nanoparticles according to claim 1, wherein the manganese oxide nanoparticles have a particle size of 30 nm or less.

4. The method for producing alkali metal manganate nanoparticles according to claim 1, wherein the heating temperature under the inert atmosphere is 150 to 350° C.

5. The method for producing alkali metal manganate nanoparticles according to claim 4, wherein the heating temperature in the inert atmosphere is lower than 250° C., producing hollow cubic crystal alkali metal manganate nanoparticles.

* * * * *